US011411687B2

(12) United States Patent
Park et al.

(10) Patent No.: US 11,411,687 B2
(45) Date of Patent: Aug. 9, 2022

(54) METHOD AND DEVICE FOR TRANSMITTING CONTROL INFORMATION IN WIRELESS CELLULAR COMMUNICATION SYSTEM

(71) Applicant: Samsung Electronics Co., Ltd., Gyeonggi-do (KR)

(72) Inventors: Sungjin Park, Incheon (KR); Jeongho Yeo, Gyeonggi-do (KR); Jinyoung Oh, Seoul (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 27 days.

(21) Appl. No.: 16/610,377

(22) PCT Filed: Apr. 27, 2018

(86) PCT No.: PCT/KR2018/004892
§ 371 (c)(1),
(2) Date: Nov. 1, 2019

(87) PCT Pub. No.: WO2018/203618
PCT Pub. Date: Aug. 11, 2018

(65) Prior Publication Data
US 2020/0145141 A1 May 7, 2020

(30) Foreign Application Priority Data
May 2, 2017 (KR) .................. 10-2017-0056400

(51) Int. Cl.
*H04L 1/18* (2006.01)
*H04L 1/16* (2006.01)
(Continued)

(52) U.S. Cl.
CPC .......... *H04L 1/1819* (2013.01); *H04L 1/1642* (2013.01); *H04W 72/042* (2013.01); *H04W 80/08* (2013.01)

(58) Field of Classification Search
CPC ... H04L 1/1819; H04L 1/1642; H04L 1/1887; H04L 1/1893; H04L 1/1896; H04L 5/00; H04W 72/042; H04W 80/08; H04W 80/02
See application file for complete search history.

(56) References Cited

U.S. PATENT DOCUMENTS

2011/0064061 A1* 3/2011 Takeuchi .............. H04L 1/1822
370/336
2013/0114573 A1 5/2013 Suzuki et al.
(Continued)

FOREIGN PATENT DOCUMENTS

KR 101596612 2/2016
KR 1020180047886 5/2018

OTHER PUBLICATIONS

PCT/ISA/210 Search Report issued on PCT/KR2018/004892, p. 5.
(Continued)

*Primary Examiner* — Dady Chery
(74) *Attorney, Agent, or Firm* — The Farrell Law Firm, P.C.

(57) ABSTRACT

Disclosed are a communication technique for merging, with IoT technology, a 5G communication system supporting a data transmission rate higher than a 4G system, and a system therefor. The present disclosure can be applied to intelligent services (for example, smart home, smart building, smart city, smart car or connected car, healthcare, digital education, retail, security and safety related services, and the like) on the basis of 5G communication technology and IoT-related technology. The present invention relates to a wireless communication system, and disclosed are a method and
(Continued)

a device for performing retransmission when data for a first-type service is damaged by a second-type service data during transmission of the data for the first-type service in a communication system.

11 Claims, 16 Drawing Sheets

(51) Int. Cl.
*H04W 72/04* (2009.01)
*H04W 80/08* (2009.01)

(56) References Cited

U.S. PATENT DOCUMENTS

| | | | | |
|---|---|---|---|---|
| 2014/0126551 A1* | 5/2014 | Nammi | ................. | H04L 1/0025 370/336 |
| 2014/0328281 A1* | 11/2014 | Ko | ....................... | H04L 1/1861 370/329 |
| 2015/0326353 A1* | 11/2015 | Ko | ....................... | H04L 5/0055 714/749 |
| 2018/0287744 A1* | 10/2018 | Sundararajan | ........ | H04L 1/1819 |
| 2018/0324816 A1* | 11/2018 | Islam | ................... | H04W 72/042 |
| 2019/0268095 A1 | 8/2019 | Yeo et al. | | |

OTHER PUBLICATIONS

PCT/ISA/237 Written Opinion issued on PCT/KR2018/004892, p. 5.

Panasonic, 3GPP TSG RAN WG1 Meeting #88bis, R1-1705179, Spokane, USA Mar. 24, 2017, "Discussion on retransmission scheme of code block groups in NR", p. 4.

Qualcomm Incorporated, 3GPP TSG-RAN WG1 #88, R1-1702639, Athens, Greece, Feb. 7, 2017, "DL URLLC/eMBB dynamic multiplexing and indication design", p. 11.

CATT, 3GPP TSG RAN WG1 Meeting #88bis, R1-1704586, Spokane, WA, USA, Mar. 25, 2017, "Multiplexing of URLLC and eMBB traffic in DL", p. 7.

ZTE, ZTE Microelectronics, Sony, Sequans, 3GPP TSG RAN WG1 Meeting #88b, R1-1704780, Mar. 25, 2017, . . .

"Considerations on using a puncturing indicator in dynamic DL resource sharing between URLLC & eMBB", p. 7.

* cited by examiner

METHOD AND DEVICE FOR TRANSMITTING CONTROL INFORMATION IN WIRELESS CELLULAR COMMUNICATION SYSTEM

PRIORITY

This application is a National Phase Entry of PCT International Application No. PCT/KR2018/004892 which was filed on Apr. 27, 2018, and claims priority to Korean Patent Application No. 10-2017-0056400, which was filed on May 2, 2017, the content of each of which is incorporated herein by reference.

The disclosure relates to a wireless communication system, and a method and an apparatus for smoothly providing a service in a communication system. More particularly, the disclosure relates to a method and an apparatus for transmitting control and data information in a communication system.

BACKGROUND ART

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, full dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud radio access network (RAN), an ultra-dense network, device to device communication (D2D), a wireless backhaul, a moving network, cooperative communication, coordinated multi-points (CoMP), and received interference cancellation to improve the system network. In addition, the 5G system has developed advanced coding modulation (ACM) schemes such as hybrid FSK and QAM modulation (FQAM) and sliding window superposition coding (SWSC), and advanced access technologies such as filter bank multi carrier (FBMC), non orthogonal multiple access (NOMA), and sparse code multiple access (SCMA).

Meanwhile, the Internet has evolved to an Internet of things (IoT) network in which distributed components such as objects exchange and process information from a human-oriented connection network in which humans generate and consume information. An Internet of everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent Internet technology (IT) service to create a new value for peoples' lives may be provided. The IoT may be applied to fields, such as a smart home, smart building, smart city, smart car, connected car, smart grid, health care, smart home appliance, or high-tech medical service, through the convergence pf the conventional Information technology (IT) and various industries.

Accordingly, various attempts to apply the 5G communication to the IoT network have been made. For example, 5G communication technologies such as a sensor network, machine-to-machine (M2M) communication, and machine-type communication (MTC) are implemented using beam-forming, MIMO, and array-antenna schemes. The application of a cloud RAN as the big data processing technology may be an example of convergence of the 5G technology and the IoT technology.

As described above, a plurality of services may be provided to a user in a communication system and the plurality of services may be provided within the same time section.

DETAILED DESCRIPTION OF INVENTION

Technical Problem

In the case in which different types of services exist in the same time interval, if one service punctures already scheduled resources of another service and uses the punctured resources, a terminal receiving data of a first type service may use the corresponding punctured resource information. At this time, if the punctured part is limited to some code blocks, redundancy version (RV) values applied to all code blocks may be different from each other. The disclosure provides various RV configuration methods therefor.

Solution to Problem

In accordance with an aspect of the disclosure, a method of receiving data by a terminal in a communication system is provided. The method includes: receiving downlink control information for scheduling retransmission of first data from a base station; identifying a second data generation indicator; receiving the retransmitted first data; identifying a value of a redundancy version (RV) applied to the retransmitted first data according to whether a resource region indicated by the second data generation indicator overlaps at least a portion of a resource region of the previously transmitted first data; and decoding the first data based on the identified value of the redundancy version.

The value of the redundancy version may be applied to each code block or each code block group, and if the resource region indicated by the second data generation indicator overlaps at least the portion of the resource region of the previously transmitted first data, the value of the redundancy version applied to the retransmitted first data may be configured as a predetermined value or configured by higher layer signaling. If the resource region indicated by the second data generation indicator does not overlap the resource region of the previously transmitted first data, the value of the redundancy version applied to the retransmitted first data may be a value of a redundancy version included in the downlink control information.

In accordance with another aspect of the disclosure, a method of transmitting data by a base station in a communication system is provided. The method includes: transmitting downlink control information for scheduling retransmission of first data; transmitting a second data generation indicator; identifying a value of a redundancy version (RV)

to be applied to the first data according to whether a resource region indicated by the second data generation indicator overlaps at least a portion of a resource region of the previously transmitted first data; and transmitting the first data to a terminal based on the identified value of the redundancy version.

In accordance with another aspect of the disclosure, a terminal receiving data in a communication system is provided. The terminal includes: a transceiver; and a controller, configured to perform control to receive downlink control information for scheduling retransmission of first data from a base station, identify a second data generation indicator, receive the retransmitted first data, identify a value of a redundancy version (RV) applied to the retransmitted first data according to whether a resource region indicated by the second data generation indicator overlaps at least a portion of a resource region of the previously transmitted first data, and decode the first data based on the identified value of the redundancy version, and connected to the transceiver.

In accordance with another aspect of the disclosure, a base station transmitting data in a communication system is provided. The base station includes: a transceiver; and a controller, configured to perform control to transmit downlink control information for scheduling retransmission of first data, transmit a second data generation indicator, identify a value of a redundancy version (RV) to be applied to the first data according to whether a resource region indicated by the second data generation indicator overlaps at least a portion of a resource region of the previously transmitted first data, and transmit the first data to a terminal based on the identified value of the redundancy version, and connected to the transceiver.

Advantageous Effects of Invention

According to the disclosure, it is possible to effectively transmit data through different types of services in a communication system. The disclosure can provide a method of effective coexistence of different types of services for data transmission, thereby satisfying a requirement of each service, reducing a transmission time delay, and efficiently using at least one of frequency-time and space resources.

MODE FOR CARRYING OUT THE INVENTION

Figure 1:
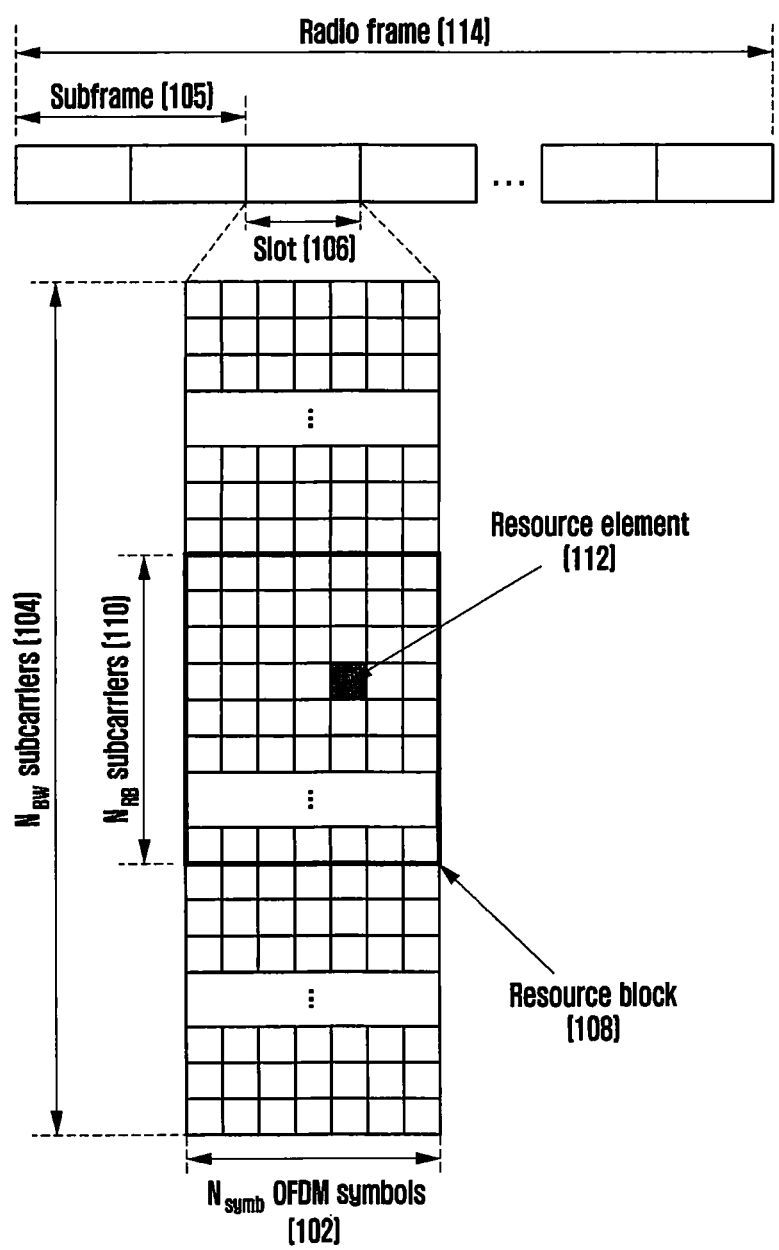
FIG. 1 illustrates the downlink time-frequency region transmission structure of the LTE or LTE-A system.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea. For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and methods of achieving the same will be apparent by referring to embodiments of the disclosure as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Further, in the embodiments, the "unit" may include at least one processor.

In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. In the following description, the embodiments of the disclosure will be described on the basis the LTE or LTE-A system by way of example, but the embodiments of the disclosure may be applied to other communication systems having similar technical backgrounds and channel types. Examples of these communication systems may include $5^{th}$ generation mobile communication technologies (5G, new radio, NR) which are being developed beyond the LTE-A system. Moreover, the embodiments of the disclosure may be applied to different devices through modifications determined and made by those skilled in the art without departing from the scope of the disclosure.

A wireless communication system has developed to be a broadband wireless communication system that provides a high speed and high quality packet data service, like the communication standards, for example, high speed packet access (HSPA) of 3GPP, long term evolution (LTE) or evolved universal terrestrial radio access (E-UTRA), LTE-advanced (LTE-A), high rate packet data (HRPD) of 3GPP2, ultra mobile broadband (UMB), and 802.16e of IEEE, or the like, beyond the voice-based service provided at the initial stage. Also, a communication standard of 5G or new radio (NR) is being developed as a 5th generation wireless communication system.

As described above, the wireless communication system including $5^{th}$ generation may provide at least one service of enhanced mobile broadband (eMBB), massive machine type communications (mMTC), and ultra-reliable and low-latency communications (URLLC) to a terminal. The services may be provided to the same terminal during the same time interval. The eMBB may be a service aiming at high-speed transmission of high-capacity data, the mMTC may be a service aiming at minimization of terminal power and access of a plurality of terminals, and the URLLC may be a service aiming at high reliability and low latency, but are not limited thereto. The three types of services may be main scenarios in the LTE system or the 5G or NR system after LTE. The disclosure describes a method of coexistence between the eMBB and the URLLC or between the mMTC and the URLLC and an apparatus using the same.

The base station may schedule data corresponding to the eMBB service in any terminal in a specific transmission time interval (TTI), and if URLLC data should be transmitted in the TTI, may not stop transmission of some of eMBB data in a frequency band in which the eMBB data has been already scheduled and is being transmitted and may transmit the generated URLLC data in the frequency band. The terminal in which the eMBB data is scheduled and the terminal in which the URLLC data is scheduled may be the same terminal or may be different terminals.

In this case, some of the eMBB data which has been already scheduled and is being transmitted are not transmitted, and thus possibility of damage of the eMBB data increases. Accordingly, in this case, it is required to determine a method of processing a signal received by the terminal in which the eMBB data is scheduled or the terminal in which URLLC data is scheduled and a method of receiving the signal. Therefore, the disclosure describes a method of coexistence between different types of services for transmitting information according to the respective services when information according to eMBB and URLLC is scheduled while sharing the partial or entire frequency band, when information according to mMTC and URLLC is simultaneously scheduled, when information according to mMTC and eMBB is simultaneously scheduled, or when information according to eMBB, URLLC, and mMTC is simultaneously scheduled.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). The uplink is a radio link through which the terminal (including a user equipment, a UE, a mobile station, an MS, a cellular phone, a smartphone, a computer, or a multimedia system capable of performing a communication system) transmits data or a control signal to a base station (corresponding to one of an eNode B, a base station, a BS, a radio access unit, a BS controller, a node on the network as an entity performing allocation of resources of the terminal), and the downlink is a radio link through which the base station transmits data or a control signal to the terminal. In such a multi-access scheme, time-frequency resources for carrying data or control information are allocated and operated in a manner to prevent overlapping of resources, that is, to establish orthogonality, between users so as to identify data or control information of each user.

When decoding fails at the initial transmission, the LTE system employs hybrid automatic repeat request (HARQ) that retransmits the corresponding data on a physical layer. In the HARQ scheme, when a receiver does not accurately decode data, the receiver transmits information (negative acknowledgement: NACK) informing a transmitter of a decoding failure and thus the transmitter may re-transmit the corresponding data on the physical layer. The receiver increase data reception performance by combining the data retransmitted by the transmitter with the data of which decoding has previously failed. Also, when the receiver accurately decodes data, the receiver transmits information (acknowledgement: ACK) informing the transmitter of decoding success and thus the transmitter may transmit new data.

Hereinafter, a higher layer signal (higher layer signaling) described in the disclosure is a signal such as a system information block (SIB), radio resource control (RRC) signaling, packet data convergence protocol (PDCP) signaling, or a medium access control control element (MAC CE), which semi-statically or statically supports the control of a specific operation of the terminal, and corresponds to a signal transmission method from the base station to the terminal through a downlink data channel of a physical layer or from the terminal to the base station through an uplink data channel of a physical layer, and a physical signal is an L1 signal and dynamically supports the control of a specific operation of the terminal in the form of terminal-common control information or terminal-specific control information.

FIG. 1 illustrates the basic structure of time-frequency regions which are radio resource regions in which data or a control channel is transmitted in the downlink of the LTE system or a system similar thereto.

Referring to FIG. 1, the horizontal axis indicates the time region and the vertical axis indicates the frequency region. A minimum transmission unit in the time region is an OFDM symbol. One slot 102 consists of $N_{symb}$ OFDM symbols 106 and one subframe 105 consists of 2 slots. The length of one slot is 0.5 ms, and the length of one subframe is 1.0 ms. A radio frame 114 is a time region interval consisting of 10 subframes. A minimum transmission unit in the frequency region is a subcarrier, and the bandwidth of an entire system transmission band consists of a total of $N_{BW}$ subcarriers 104. However, such detailed values may be variable.

A basic unit of resources in the time-frequency regions is a resource element (RE) 112 and may be indicated by an OFDM symbol index and a subcarrier index: A resource block (RB or physical resource block (PRB)) 108 is defined by $N_{symb}$ consecutive OFDM symbols 102 in the time region and $N_{RB}$ consecutive subcarriers 110 in the frequency region. Accordingly, one RB 108 may include $N_{symb} \times N_{RB}$ REs 112 in one slot. In general, a minimum data allocation unit in the frequency region is the RB, and $N_{symb}=7$, $N_{RB}=12$, and $N_{BW}$ may be proportional to a bandwidth of a system transmission band in the LTE system.

A data rate increases in proportion to the number of RBs scheduled in the terminal. In the LTE system, 6 transmission bandwidths are defined and used. In the case of a frequency division duplex (FDD) system, in which the downlink and the uplink are divided by the frequency, a downlink transmission bandwidth and an uplink transmission bandwidth may be different from each other. A channel bandwidth refers to a radio frequency (RF) bandwidth corresponding to the system transmission bandwidth. [Table 1] indicates a relationship between a system transmission bandwidth and a channel bandwidth defined in the LTE system. For example, when LTE system has a channel bandwidth of 10 MHz, the transmission bandwidth may include 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Downlink control information may be transmitted within first N OFDM symbols in the subframe. According to an embodiment, generally, N={1, 2, 3}. Accordingly, N may be variable for each subframe according to an amount of control information to be transmitted in the current subframe. The control information to be transmitted may include a control channel transmission interval indicator indicating how many OFDM symbols are used for transmitting the control information, scheduling information of downlink data or uplink data, and information on HARQ ACK/NACK signals.

In the LTE system, the scheduling information of downlink data or uplink data is transmitted from the base station to the UE through downlink control information (DCI). The DCI is defined in various formats. The determined DCI format is applied and operated according to whether the DCI is scheduling information (UL grant) for uplink data or scheduling information (DL grant) for downlink data, whether the DCI is compact DCI having small size control information, whether the DCI applies spatial multiplexing using multiple antennas, and whether the DCI is DCI for controlling power. For example, DCI format 1 which is scheduling control information (DL grant) of downlink data may include one of pieces of the following information.

Resource allocation type 0/1 flag: indicates whether a resource allocation type is type 0 or type 1. Type 0 applies a bitmap scheme and allocates resources in units of resource block groups (RBGs). In the LTE system, a basic scheduling unit is a resource block (RB) expressed by time and frequency domain resources, and an RBG includes a plurality of RBs and is used as a basic scheduling unit in the type 0 scheme. Type 1 allows allocation of a predetermined RB in an RBG.

Resource block assignment: indicates RBs allocated to data transmission. Expressed resources are determined according to the system bandwidth and the resource allocation type.

Modulation and coding scheme (MCS): indicates a modulation scheme used for data transmission and the size of a transport block (TB) which is data to be transmitted.

HARQ process number: indicates a process number of HARQ.

New data indicator: indicates HARQ initial transmission or HARQ retransmission.

Redundancy version (RV): indicates a redundancy version of HARQ.

Transmit power control (TPC) command for physical uplink control channel (PUCCH): indicates a transmission power control command for a PUCCH which is an uplink control channel.

The DCI may be transmitted through a physical downlink control channel (PDCCH) or enhanced PDCCH (EPDCCH) which is a physical control channel via a channel-coding and modulation process. Hereinafter, PDCCH or EPDCCH transmission/reception may be interchangeable with downlink control information transmission/reception on the PDCCH or the EPDCCH. Similarly, PDSCH transmission/reception may be interchangeable with downlink data transmission/reception on the PDSCH. Such technology may be applied to other control information, data, and channels.

In general, the DCI is scrambled with a particular radio network temporary identifier (RNTI) (or a terminal identifier), independently for each terminal, a cyclic redundancy check (CRC) bit is added thereto, and then channel coding is performed, whereby each independent PDCCH is configured and transmitted. In the time region, the PDCCH is mapped and transmitted during the control channel transmission interval. The mapping location of the PDCCH in the frequency region is determined by an identifier (ID) of each terminal and distributed to the entire system transmission bandwidth.

Downlink data may be transmitted through a physical downlink shared channel (PDSCH) which is a physical channel for transmitting downlink data. The PDSCH may be transmitted after the control channel transmission interval, and the detailed mapping location in the frequency region and scheduling information such as the modulation scheme are determined on the basis of the DCI transmitted through the PDCCH.

Through the MCS in the control information included in the DCI, the base station notifies the terminal of a modulation scheme applied to the PDSCH to be transmitted to the terminal and the size of data (transport block size (TBS)) to be transmitted. According to an embodiment, the MCS may include 5 bits or larger or smaller bits. The TBS corresponds to the size before channel coding for error correction is applied to the data (TB) to be transmitted by the base station.

The modulation scheme supported by the LTE system includes quadrature phase shift keying (QPSK), 16 quadrature amplitude modulation (16 QAM), and 64 QAM, and modulation orders (Qm) thereof correspond to 2, 4, and 6, respectively. That is, the base station may transmit 2 bits per symbol in the QPSK modulation, 4 bits per symbol in the 16 QAM, and 6 bits per symbol in the 64 QAM. Further, a modulation scheme higher than or equal to 256 QAM may be used according to system deformation.

Figure 2:
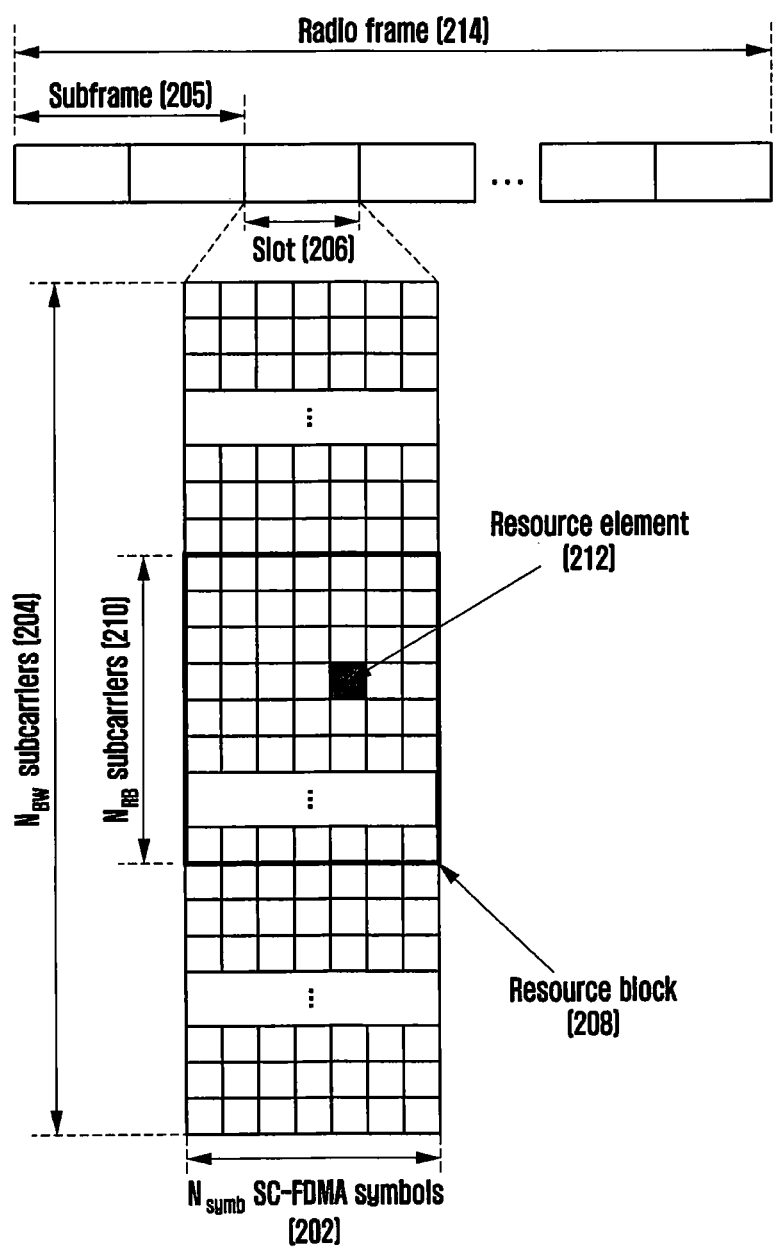
FIG. 2 illustrates the uplink time-frequency region transmission structure of the LTE or LTE-A system.

FIG. 2 illustrates the basic structure of time-frequency regions which are radio resource regions in which data or a control channel is transmitted in the uplink of the LTE system.

Referring to FIG. 2, the horizontal axis indicates a time region and the vertical axis indicates a frequency region. A minimum transmission unit in the time region is an SC-FDM system 202 and one slot 206 consists of $N_{symb}$ SC-FDMA symbols. One subframe 205 consists of two slots. A minimum transmission unit in the frequency region is a subcarrier, and an entire system transmission band 204 consists of a total of $N_{BW}$ subcarriers. $N_{BW}$ may have a value proportional to the system transmission band.

A basic unit of resources in the time-frequency regions is a resource element 212 and may be defined by an SC-FDMA symbol index and a subcarrier index. A resource block 208 may be defined by $N_{symb}$ consecutive SC-FDMA symbols in the time region and $N_{RB}$ consecutive subcarriers in the frequency region. Accordingly, one RB consists of $N_{symb} \times N_{RB}$ REs. In general, a minimum transmission unit of data or control information is an RB. A PUCCH is mapped to the frequency domain corresponding to 1 RB and is transmitted during one subframe.

The timing relation between a PDSCH which is a physical channel for transmitting downlink data or a PDCCH or an EPDCCH including semi-persistent scheduling release (or SPS release) and a PUCCH or a PUSCH which is an uplink physical channel for transmitting HARQ ACK/NACK is defined in the LTE system. For example, in the LTE system operating in FDD type, HARQ ACK/NACK corresponding to a PDSCH transmitted in an $(n-4)^{th}$ subframe or a PDCCH or an EPDCCH including SRS release is transmitted to a PUCCH or a PUSCH in an $n^{th}$ subframe.

In the LTE system, a downlink HARQ adapts an asynchronous HARQ scheme in which a data retransmission time point is not fixed. That is, when the base station receives a HARQ NACK feedback of initial transmission data, which the base station transmitted, from the terminal, the base station freely determines a time point at which retransmission data is transmitted via a scheduling operation. For the HARQ operation, the terminal buffers data which is determined as an error on the basis of the result of decoding of the received data and then combines the data with a subsequent retransmission data.

When the UE receives a PDSCH including downlink data transmitted from the BS through subframe n, the terminal transmits uplink control information including HARQ ACK or NACK of the downlink data to the base station through a PUCCH or a PUSCH in subframe n+k. In this instance, k is defined differently according to FDD or time division duplex (TDD) of the LTE system and a configuration thereof. For example, in the case of the FDD LTE system, k is fixed to 4. In the case of the TDD LTE system, k may be changed according to a subframe configuration and a subframe number. Further, when data is transmitted through a plurality of carriers, k may be differently applied according to TDD configuration of each carrier.

In the LTE system, unlike downlink HARQ, uplink HARQ adopts a synchronous HARQ scheme in which a data transmission time point is fixed. That is, the uplink/downlink timing relationship between a physical uplink shared channel (PUSCH), which is a physical channel for uplink data transmission, a PDCCH, which is a preceding downlink control channel, and a physical hybrid indicator channel (PHICH), which is a physical channel for transmitting downlink HARQ ACK/NACK corresponding to uplink data on the PUSCH, is fixed by the following rule.

If the terminal receives a PDCCH including uplink scheduling control information transmitted from the base station or a PHICH for transmitting downlink HARQ ACK/NACK through subframe n, the terminal transmits uplink data corresponding to the control information to the base station through a PUSCH in subframe n+k. At this time, k is differently defined depending on FDD or TDD of the LTE system and the configuration thereof. For example, in the case of the FDD LTE system, k is fixed to 4. In the case of the TDD LTE system, k may be changed according to a subframe configuration and a subframe number. Further, when data is transmitted through a plurality of carriers, k may be differently applied according to TDD configuration of each carrier.

If the terminal receives a PHICH including information related to a downlink HARQ ACK/NACK from the UE in sub-frame i, the PHICH corresponds to a PUSCH transmitted by the UE in sub-frame (i-k). In this instance, k is defined differently according to FDD or TDD of the LTE system and a configuration thereof. For example, in the case of the FDD LTE system, k is fixed to 4. In the case of the TDD LTE system, k may be changed according to a subframe configuration and a subframe number. Further, when data is transmitted through a plurality of carriers, k may be differently applied according to TDD configuration of each carrier.

TABLE 2

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
|  | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
|  | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
|  | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
|  | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subclause 7.1.2) |
|  | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
|  | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 2B | UE specific by C-RNTI | Dual layer transmission, port 7 and 8 (see subclause 7.1.5A) or single-antenna port, port 7 or 8 (see subclause 7.1.1) |

[Table 2] above shows supportable DCI formats according to each transmission mode in a condition set by a C-RNTI in 3GPP TS 36.213. The terminal assumes the existence of the corresponding DCI in a control area interval according to a preset transmission mode and performs a search and decoding. For example, if transmission mode 8 is indicated to the terminal, the terminal searches for DCI format 1A in a common search space and a UE-specific search space and searches for DCI format 2B only in the UE-specific search space.

The description of the wireless communication system has been made on the basis of the LTE system, but the disclosure is not limited to the LTE system and may be applied to various wireless communication systems such as NR and 5G. If the embodiments are applied to another wireless communication system, k may be changed and applied to the system using a modulation scheme corresponding to FDD.

Figure 3:
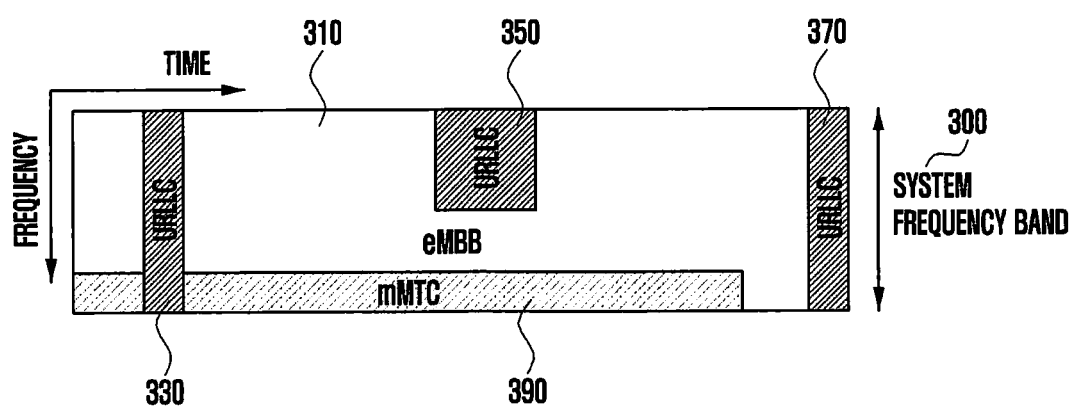
FIG. 3 illustrates an example in which eMBB, URLLC, and mMTC data are allocated in frequency-time resources in a communication system.
Figure 4:
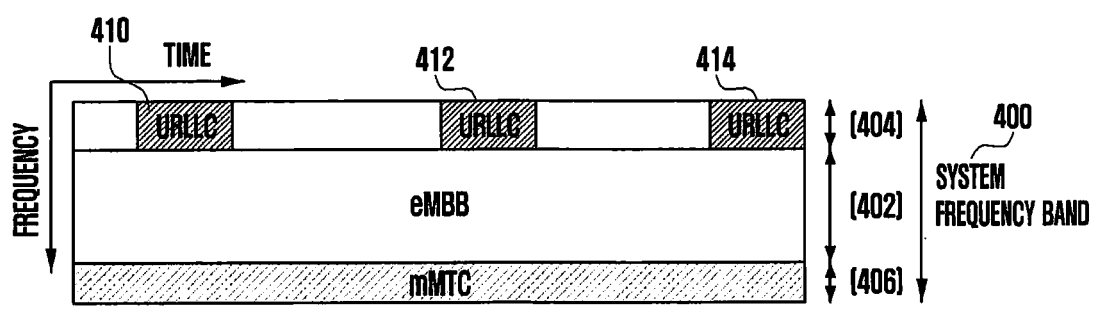
FIG. 4 illustrates an example in which eMBB, URLLC, and mMTC data are allocated in frequency-time resources in a communication system.

FIGS. 3 and 4 illustrate examples of allocating data for eMBB, URLLC, and mMTC which are services considered in the 5G or NR system to frequency-time regions.

Referring to FIGS. 3 and 4, schemes through which frequency and time resource regions are allocated for information transmission in respective systems.

In FIG. 3, eMBB, URLLC, and mMTC data are allocated to an entire system frequency band 300. If URLLC data 330, 350, and 370 are generated and are required to be transmitted while eMBB 310 and mMTC 390 are allocated to specific frequency bands and transmitted, the part to which the eMBB 310 and the mMTC data 390 have been already allocated may be emptied or the URLLC data 330, 350, and 370 may be transmitted without transmission of the data. Among the services, the URLLC needs to reduce a delay time, so that the URLLC data 330, 350, and 370 may be allocated to and transmitted in a portion of the resources 310 to which the eMBB has been allocated. Of course, if the URLLC is additionally allocated to and transmitted in resources to which the eMBB has been allocated, eMBB data may not be transmitted in duplicate frequency-time resources, and accordingly, the performance of eMBB data transmission may be reduced. That is, in the above case, eMBB data transmission may fail due to URLLC allocation.

FIG. 4 illustrates an example of dividing an entire system frequency band 400 into subbands 402, 404, and 406 and using the subband for services and data transmission. Information related to the subband configuration may be predetermined, and the predetermined configuration information may be transmitted to the terminal by the base station through higher layer signaling. Alternatively, the subbands may be randomly divided by the base station or a network node and may provide services to the terminal without separate transmission of subband configuration information. In FIG. 4, a subband 402 is used for eMBB data transmission, a subband 404 is used for URLLC data transmission, and a subband 406 is used for mMTC data transmission.

Throughout the embodiment, the length of a transmission time interval (TTI) used for URLLC transmission may be shorter than the length of a TTI used for eMBB or mMTC transmission. Further, a response of information related to URLLC may be transmitted earlier than that of eMBB or mMTC, and thus information may be transmitted and received with a lower delay.

An eMBB service described below is referred to as a first type service, and data for eMBB is referred to as first type data. The first type service or the first type data is not limited to eMBB and may correspond to the case in which high-speed data transmission is needed or broadband transmission is performed. A URLLC service is referred to as a second type service, and data for URLLC is referred to second type data. The second type service or the second type data is not limited to URLLC and may be correspond to the case in which a low-delay time is needed or high-reliable transmission is needed or another system in which both the low-delay time and the high-reliable transmission are needed. An mMTC service is referred to as a third type service, and data for mMTC is referred to as third type data. The third type service or the third type data is not limited to mMTC and may correspond to the case in which low speed, wide coverage, or low power is needed. In description of the embodiment, it may be understood that the first type service includes the third type service or does not include the third type service.

The structure of a physical layer channel used for each type in order to transmit the three types of services or data may be different. For example, at least one of the length of a transmission time interval (TTI), the unit of allocation of frequency resources, the structure of a control channel, and a data mapping method may be different.

Although the three types of services and three types of data have been described above, more types of services and pieces of data corresponding thereto may exist, and in this case the disclosure can be applied thereto.

Terms "physical channel" and "signal" in the conventional LTE or LTE-A system may be used to describe the method and the apparatus proposed by embodiments. However, embodiments of the disclosure can be applied to a wireless communication system rather than the LTE and LTE-A systems.

As described above, the embodiment defines transmission/reception operations of the terminal and the base station for transmission of the first type, second type, and third type services or data and proposes a detailed method of simultaneously operating terminals, in which different types of services or data are scheduled, within the same system. In the disclosure, a first type terminal, a second type terminal, and a third type terminal are terminals in which the first type service or data, the second type service or data, and the third type service or data are scheduled, respectively. In the embodiment, the first type terminal, the second type terminal, and the third type terminal may be the same terminal or may be different terminals.

The disclosure can also be applied to FDD and TDD systems.

The disclosure can be thoroughly applied not only to the downlink but also to the uplink. That is, a downlink operation for describing a process in which the base station transmits control and data information to the terminal can be thoroughly applied to an uplink operation for describing a process in which the terminal transmits control and data information to the base station.

The first type service and the second type service described in the disclosure are services that satisfy different requirements. For example, the first type service may be eMBB and the second type service may be URLLC. Alternatively, the reverse is possible, and mMTC may be the first service or the second service. Alternatively, one of eMBB, URLLC, and mMTC may be the first service and another may be the second service. Resources described in the disclosure may be used as a concept including time, frequency, code, or space, or all or some thereof.

In the disclosure, there may be terminals using only the first type service. There may be terminals using only the second type service. There may be terminals using both the first type service and the second type service. There may be terminals capable of using a portion of the first type service and the second type service (for example, one piece of control information and data information).

The network or base station (hereinafter, referred to as the base station) may transmit one or more pieces of control information among scheduling information for downlink data transmission and scheduling information for uplink data transmission to the terminal through a downlink control channel in every subframe, every slot, or every mini-slot, or every TTI (hereinafter, referred to as slot). That is, the terminal monitors whether there is scheduling information for downlink data transmission or scheduling information for uplink data transmission transferred to the terminal through the downlink control channel in every subframe or every slot. The terminal normally receiving the downlink scheduling information or the uplink scheduling configuration information transmitted through the downlink control channel may receive downlink data according to the received scheduling configuration information or transmit an uplink signal of at least one piece of uplink data and uplink control information to the base station.

Specifically, the terminal may monitor uplink/downlink scheduling information transmitted through the downlink control channel in a downlink control channel motoring time and frequency region (hereinafter, referred to as a downlink control channel monitoring region) in every subframe, every slot, every mini-slot, or every TTI. The downlink control channel monitoring region may be the entire frequency band, may be defined in advance, or configured through signaling of at least one of information transmitted from the base station through a higher signal or a physical broadcast channel (PBCH), SIB, or information transmitted on a group-common control channel or a UE-specific control channel transmitted through the downlink control channel. For example, the downlink control channel monitoring frequency region may be configured through a higher layer signal, and the downlink control channel monitoring time region may be configured by a configuration value of a specific field (for example, a control field indicator (CFI) of the group-common control channel or the UE-specific control channel. At this time, the downlink control channel monitoring time region may vary every slot.

The base station may configure a monitoring period, interval, or a time point (hereinafter, referred to as the time point) of the uplink/downlink scheduling information transmitted through the downlink control channel to be longer than every slot, thereby minimizing power consumption of the terminal spent for monitoring the uplink/downlink scheduling information transmitted through the downlink control channel. At this time, the monitoring time point of the uplink/downlink scheduling information transmitted through the downlink control channel may be configured by the base station in the terminal through at least one of a higher layer signal or a group-common control channel or a UE-specific control channel transmitted through the downlink control channel. The terminal in which the monitoring time point of the uplink/downlink scheduling information transmitted through the downlink control channel is configured through the higher layer signal may monitor the uplink/downlink scheduling information transmitted through the downlink control channel in every slot right before configuration through the higher layer signal (RRC configuration or RRC reconfiguration) is completed or right before a higher layer signal configuration completion message or ACK/NACK information for the higher layer signal is transmitted to the base station.

Figure 5:
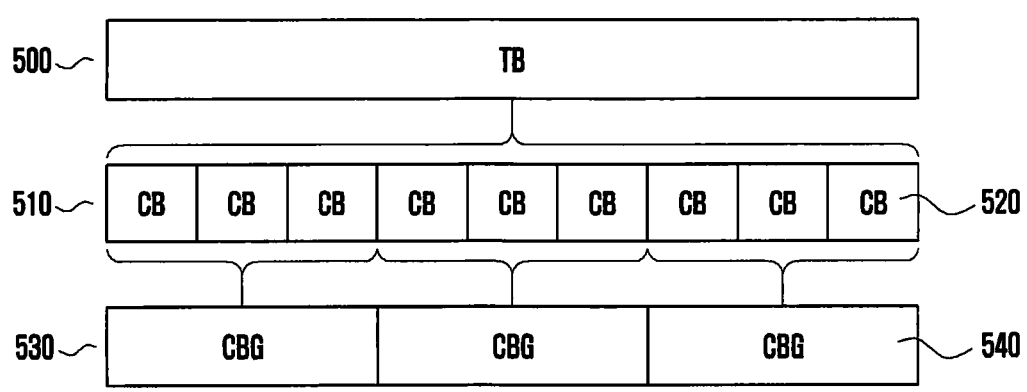
FIG. 5 illustrates a method of generating code block groups.

FIG. 5 illustrates a method of generating a code block group (CBG). The terminal receives one transport block (TB) 500 during a transmission interval scheduled by the base station. The transport block consists of one or a plurality of code blocks (CBs) 510, and the terminal determines that the corresponding transport block is successfully transmitted only when reception of individual code blocks are all successful. If reception of at least one of the individual code blocks fails, the terminal determines that transmission of the corresponding transport block fails. FIG. 5 illustrates an example in which 9 code blocks 510 exist in one transport block 500. Each code block may have the same number of bits, only some code blocks may have the same number of bits, or all code blocks may have different numbers of bits.

In the conventional LTE system, in spite of damage of only one CB 520, the TB including the corresponding CB should be retransmitted. However, in the next-generation mobile communication, a CBG 530 which corresponds to an intermediate level between the CB and the TB has been introduced. The CBG is an entity consisting of one or a plurality of CBs, and one or a plurality of CBGs may exist in one TB. FIG. 5 illustrates an example in which one CBG 540 consists of 3 CBs and one TB consists of a total of 3 CBGs. Unlike FIG. 5, respective CBGs may have different numbers of CBs. Further, CBs within the CBG have adjacent numbers from each other. For example, only CB 1 and CB 3 cannot be included in one CBG, but CB 1, CB 2, and CB 3 can be included in one CBG. That is, only consecutive CBs can be included in one CBG. Further, only one CB can be included in one CBG.

The terminal may determine whether demodulation and/or decoding is successful for each CBG and individually report on the result to the base station. Accordingly, if decoding of only one CB fails, the transmitter should retransmit the whole TB in the conventional LTE system, but the transmitter may retransmit only the CBG including the CB of which decoding fails in the next-generation mobile communication. The CBGs are logically arranged in FIG. 5, but respective CBGs may be physically arranged in different times, frequencies, or spaces, or combinations thereof.

Figure 6:
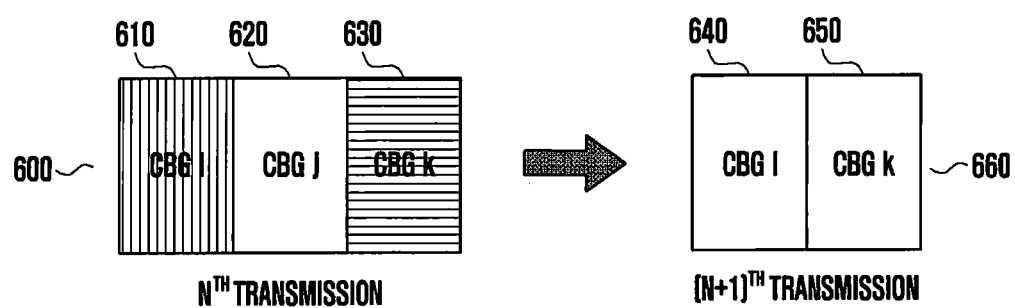
FIG. 6 illustrates an example of a code block group unit transmission method.

FIG. 6 illustrates an example of a code block group unit transmission method.

In FIG. 6, in $N^{th}$ transmission 600, the terminal receives downlink data information including a CBG i 610, a CBG j 620, and a CBG k 630 from the base station through a downlink data channel. The terminal may detect CBG numbers and the number of CBGs included in the downlink data through terminal-specific downlink control information. At this time, some or all of the CBs included in the CBG i 610 may be damaged by a low channel gain and thus decoding of the terminal may not be possible. Some or all of the CBs included in the CBG k 630 may be damaged by data of the second type service such as URLLC and thus decoding of the terminal may not be possible. At this time, after receiving HARQ feedback of the $N^{th}$ transmission from the terminal through the uplink control channel, the base station retransmits again the CBGs of which transmission has failed in the $N^{th}$ transmission. In (N+1)th transmission 660, the base station transmits only the CBG i 640 and the CBG k 650 except for the CBG j 620, which is successfully transmitted in $N^{th}$ transmission, to the terminal through the downlink data channel.

At this time, since transmission of the CBG i 640 has failed in the $N^{th}$ transmission due to the channel, it is advantageous to retransmit the CBG i 640 by increasing a coding gain through a change in a redundancy version (RV) value. That is, the CBG i 610 in the $N^{th}$ transmission and the CBG i 640 in the $(N+1)^{th}$ transmission may have different RB values, and accordingly, the terminal may increase a coding gain in HARQ combining. On the other hand, HARQ combining of the CBG k 650 in the $(N+1)^{th}$ transmission and the CBG k 630 in the $N^{th}$ transmission is not advantageous. This is because data of the second type service such as URLLC is allocated to some or all of the downlink data channels to which the CBG k 630 is allocated in the $N^{th}$ transmission. Accordingly, it is preferable that the terminal demodulates and decodes only the CBG k 650 in the $(N+1)^{th}$ transmission.

Of course, if the base station can inform the UE in detail of second type service generation information generated in the $N^{th}$ transmission through a combination of frequency or/and time, the terminal may use a portion of the CBG k 630 in the $N^{th}$ transmission (a portion which is not damaged by data allocated for the second type service) for performing HARQ combining with the CBG k 650 in the $(N+1)^{th}$ transmission. However, if the second type service generation information is informed in units of CBGs, the above operation may be impossible, and in this case, the terminal may perform demodulation and decoding only through the CBG k in the $(N+1)^{th}$ transmission.

If N is 1, the terminal performs demodulation and decoding using only the second transmitted CBG k (or along with a portion of the first transmission CBG k). If the scheme in the conventional LTE system is applied, CBs included in all TBs may be transmitted having an RV value including a system bit in the first transmission, and may be transmitted having a value (including a parity bit) different from the RV value configured in the first transmission through a circular buffer rate matching scheme in the retransmission. Such a scheme can be applied to the case in which the CB in the first transmission is damaged by the channel.

However, the method cannot be used when the CB is damaged by data of the second type service such as URLLC in the first transmission (that is, some or all of the resources allocated to the first type service are actually used for transmission of data of the second type service, and thus some or all of the data of the first type service cannot be actually transmitted to the terminal). That is, as described above, with respect to code block groups including some code blocks (or a portion of the code block) damaged by data for an emergency service such as URLLC, the transmitter should transmit the CBG including CBs having the same value as the RV value, configured in previous transmission, in (N+1)'h transmission or transmit the CBG including CBs (or CBs including a system bit, CBs including an important bit, or a system bit stored in a circular buffer) having an RB always including a system bit (for example, RV having 0 on the basis of the LTE system) in $(N+1)^{th}$ transmission. For example, if N is 1, CBGs i, j, and k are all rate-matched and transmitted on the basis of the RV of 0 including the system bit in the first transmission. In the second transmission, the CBG i is damaged by the channel and thus may have an RV of 1 different from the RV of 0. On the other hand, in the second transmission, the CBG k is damaged by data of the second type service and thus it is preferable to set the RV as 0.

The above operation can be easily supported if the RV value exists for each CBG (or each CB). Specifically, downlink control information transmitted through a downlink control channel may have an RV value existing for each CBG configured by the standard, semi-statically configured through a higher layer signal, or dynamically configured through a physical signal. The RV values are used for informing of the RV value of each CBG. Alternatively, in addition to the RV value for each CBG, the RV value may exist for each CB, or an entity including one or more CBGs may be indicated by one common RV. The RV configuration may be determined by the standard or may be semi-statically configured through a higher layer signal or dynamically configured through a physical signal. Indication of the RV may mean that a start point of a rate-matched output sequence existing in the circular buffer of the corresponding CBG or CB is the corresponding RV.

Meanwhile, if only one RV bit value exists for each transport block, it is difficult to simultaneously inform the terminal of different RV values applied to different code blocks or code block groups. However, if the second type service generation indicator such as URLLC is included in downlink control information, the terminal may indirectly determine different RV value configurations therethrough. If the second type service generation indicator has an OFDM symbol unit or a mini-slot or slot unit including several OFDM symbols, the terminal may implicitly assume that code blocks or code block groups for first type service data included in an entirety or a part of the region indicated by the corresponding indicator all have the RV value configured in previous transmission or are configured to have the RV value including a system bit.

That is, with respect to a code block or a code block group included in all or some of a time (for example, symbol slot, or mini-slot) indicated by the second type service generation indicator included in downlink control information indicating retransmission, a frequency region (in units of PRBs or PRB groups), or a combination thereof (code block or code block group), the terminal does not always follow the indicated RV value in units of transport blocks included in the downlink control information. Alternatively, a code block or a code block group included in all or some of a time (for example, symbol slot, or mini-slot) indicated by the second type service generation indicator included in downlink control information indicating retransmission, a frequency region (in units of PRBs or PRB groups), or a combination thereof (code block or code block group) may have a value different from the RV value in units of transport blocks included in the downlink control information. Alternatively, the terminal may use a value (for example, an RV value having a system bit), which is predetermined as an RV value configured in a code block or a code block group included in all or some of a time (for example, symbol slot, or mini-slot) indicated by the second type service generation indicator included in downlink control information indicating retransmission, a frequency region (in units of PRBs or PRB groups), or a combination thereof (code block or code block group) or an RV value configured in previous transmission, which is prior to the RV value in units of transport blocks included in the downlink control information, or the terminal ignores a value indicated by the RV in units of transport blocks included in the downlink control information. The operation may be an operation effective only in second transmission (or first retransmission). The CBGs are logically arranged in FIG. 6, but respective CBGs may be arranged in different times, frequencies, or spaces, or combinations thereof.

In the disclosure, transmission with an RV x value or bit (or the corresponding code block or code block group having the RV value or configured as the RV value) means that the code block is rate-matched on the basis of the RV x in the circular buffer operation and mapped to the physical data channel. Alternatively, it means that the transmitter generates a rate-matching output bit sequence on the basis of one code block in consideration of the RV x. Alternatively, it means that the transmitter generates a bit sequence in the form of a circular buffer through an encoder and an interleaver on the basis of one code block and informs of a start point of the corresponding bit sequence through the RV x. Such a concept can be applied throughout the disclosure in common.

Figure 7:
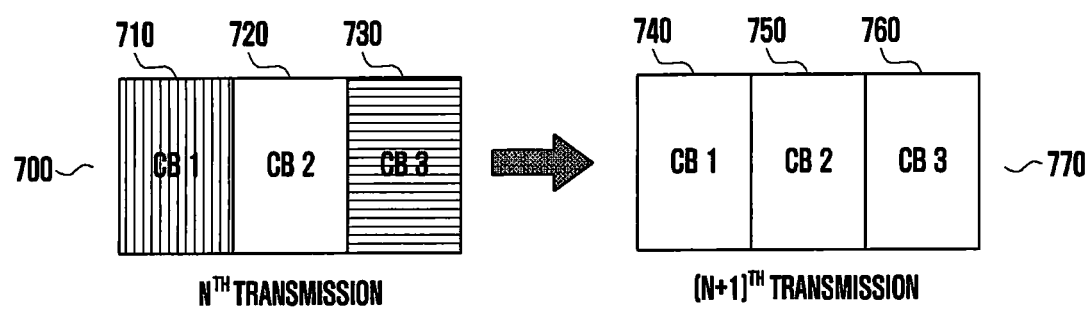
FIG. 7 illustrates another example of the code block group unit transmission method.

FIG. 7 illustrates another example of the code block group unit transmission method.

FIG. 7 basically illustrates an operation similar to that of FIG. 6, but FIG. 7 illustrates a situation in which retransmission is not adaptively performed in unit of code block groups. That is, retransmission in units of transmission blocks which is the same as the LTE system can be supported. If a first code block 710 is damaged by a channel and a third code block 730 is damaged by the second type service such as URLLC in $N^{th}$ transmission 700, the base station should retransmit the transport block including the corresponding code blocks. The base station retransmits all code blocks, which had been transmitted in $N^{th}$ transmission, in (N+1)th transmission 770.

At this time, it is preferable that a retransmission code block 760 of the third code block 730 damaged by the second service type such as URLLC has an RV value different from RV values of retransmitted other code blocks 740 and 750. If downlink control information includes the RV value configured to each code block or the RV value configured for each code block group including a plurality of code blocks, the terminal may naturally determine that the third code block 760 has an RV value different from RV values of the first and second code blocks 740 and 750. However, if the RV value exists for each transport block (or if the RV value does not exist for each code block or each code block group), the terminal cannot determine that the third code block 760 has the RV value different from RV values of other code blocks 740 and 750.

At this time, if an indicator indicating that the third code block 760 is damaged by data of the second type service such as URLLC rather than the channel is included in downlink control information such as the RV value, the terminal can implicitly determine the configured RV value of the third code block 760 through the information. That is, the RV value of the third code block 760 may be determined as a value configured by the standard (for example, an RV value having a system bit or an RV value applied in previous transmission), as a value semi-statically configured through a higher layer signal, as a value dynamically configured through a physical signal, or as a combination thereof. It is natural that other code blocks 740 and 750 have values indicated by RV values in units of transport blocks included in downlink control information indicating transmission of the corresponding code blocks.

That is, the terminal may indirectly determine that the RV value configured in the third code block 760 and RV values in other code blocks 740 and 750 may be configured independently from each other through the second type service generation indicator such as URLLC included in downlink control information (for example, a downlink terminal-specific control channel or a downlink terminal-common control channel) and the RV field in units of transport blocks. The two RV values may have the same value. However, if a unit of the second type service generation indicator is a code block, RV values of code blocks indicated by the second type service generation indicator ignores (or do not follow) an RV value (in units of TBs) indicated by downlink control information and follows an RV value configured by the standard in advance, semi-statically configured through a higher layer signal, or dynamically configured through a physical signal. If the unit of the second type service generation indicator is a time (a symbol, a mini-slot, or a slot), a frequency (a PRB or a PRB group), or a combination thereof, RV values of the code blocks, the code blocks being mapped to a resource region at least partially overlapping the corresponding indicated resource region, ignore (or do not follow) the RV value (in units of TBs) indicated by downlink control information and follow the RV value configured in advance by the standard, semi-statically configured through a higher layer signal, or dynamically configured through a physical layer.

The case in which the RV value is determined by the standard means that a rate-matched output sequence always starting at a point indicated by a predetermined RV value (for example, RV 0) in the circular buffer is mapped to a physical data channel. The circular buffer may include a combination of sequences generated after one code block passes through an encoder and an interleaver. The case in which the RV value is configured through the semi-static higher layer signal means that the RV value is informed through a channel of SIB, RRC, or MAC CE. The case in which the RV value is configured through the dynamic physical signal means that a bit indicating the RV value is transmitted while being included in downlink control information transmitted through a terminal-common control channel, a terminal-specific control channel, or a terminal group control channel.

Figure 8:
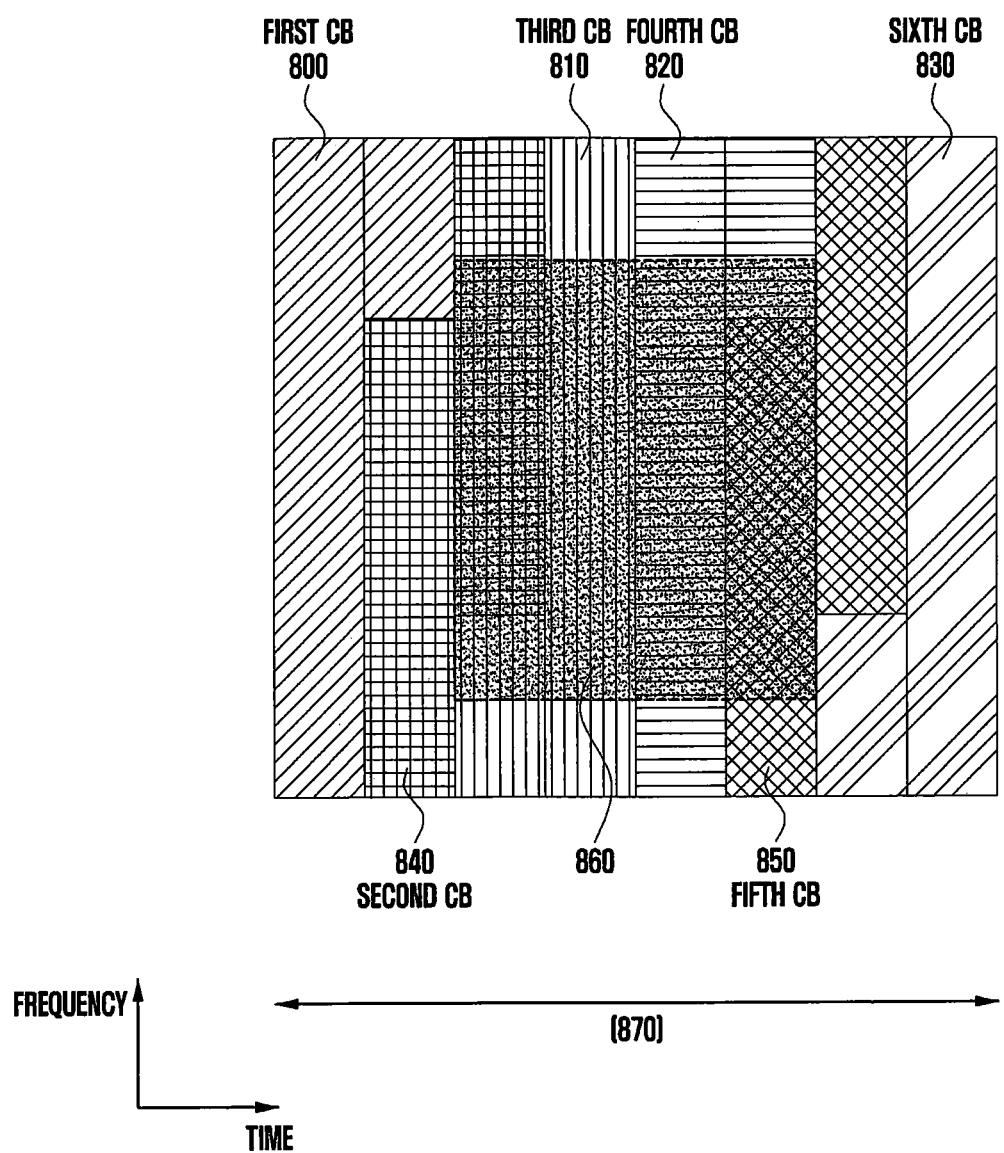
FIG. 8 illustrates a mapping relationship between data of a first type service and data of a second type service.

FIG. 8 illustrates a mapping relationship between data of the first type service and data of the second type service.

FIG. 8 illustrates the part, which is logically illustrated in FIG. 7, in a view point of a physical channel. The terminal receives 6 code blocks 800 to 850 during one transmission interval 870 consisting of 8 OFDM symbols. The code blocks are to transmit data of the first type service such as eMBB. A portion 860 of the downlink data channel configured to the pre-scheduled first type service may be used for data of the second type service such as URLLC in addition to the first type service. Since the data of the second type service is actually transmitted in the portion 860 of the downlink data channel, the terminal using the first type service is required to detect the information.

In order to detect the information, the second type service generation indicator may be used. The information may be transmitted during the transmission interval 870 or may be transmitted to the terminal while being included in downlink control information indicating retransmission of the transmission. The second type service generation indicator may have the form in which an NDI includes a plurality of bits or may be configured in units of time (symbols, mini-slots, or slots), frequencies (PRBs, PRB groups, or bandwidth parts), a combination thereof, or units of code blocks (or code block groups) and provided to the terminal.

In FIG. 8, if the second type service generation indicator indicates resources only in units of time, the terminal may be informed of resources in which the second type service is generated in units of mini-slots including third to seventh symbols in which the second type service data is generated or in units of longer time. Alternatively, in FIG. 8, if the second type service generation indicator indicates resources in units of time and frequencies, the terminal may be informed of resources in which the second type service is generated in units of mini-slots including third to seventh symbols in which the second type service data is generated or in units of combinations of longer time and PRBs. Alternatively, in FIG. 8, if the second type service generation indicator indicates resources in units of code blocks or code block groups, the terminal may be informed of a code block and a code block group including a region in which the second type service data exists. Accordingly, it may be informed that only code blocks (the second CB 840, the third CB 810, the fourth CB 820, and the fifth CB 850) for the first type service are damaged by the data of the second type service according to the minimum indication unit of the second type service generation indicator.

If the minimum indication unit of the second type service generation indicator is the transmission interval 870, the second type service generation indicator informs the terminal that a total of 6 code blocks 800 to 850 are damaged by the second type service data. However, if the first code block 800 and the sixth code block 830 are successfully demodulated and decoded at least without damage by the channel, reception of the second type service generation indicator by the terminal does not significantly influence future reception processing. However, if the first code block 800 and the sixth code block 830 are damaged by the channel, the minimum indication unit of the second type service generation indicator is the transmission interval 870, so that the terminal may determine that the first code block 800 and the sixth code block 830 are damaged by the second type service data. Accordingly, in this case, the corresponding received code blocks are discarded and only code blocks retransmitted later may be used for demodulation and decoding.

Figure 9:
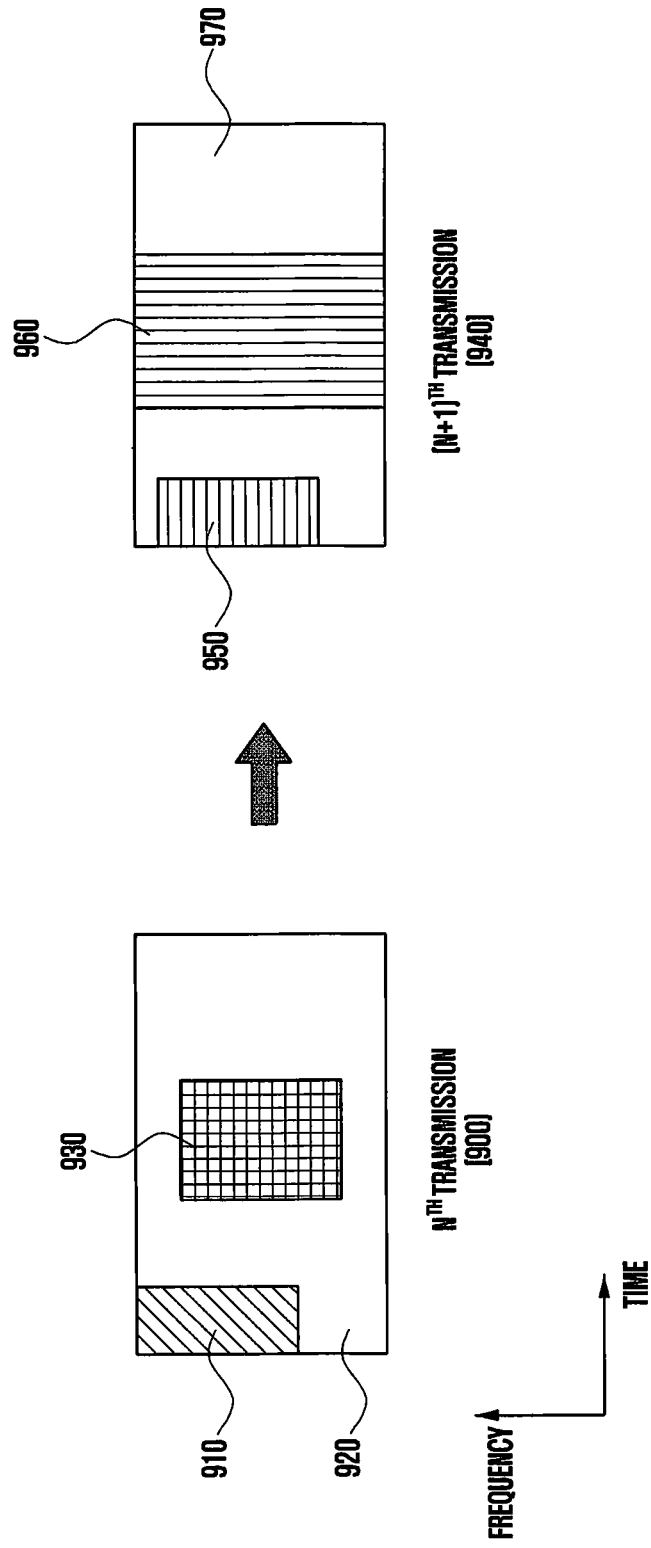
FIG. 9 illustrates a method of receiving first type service data through a second type service generation indicator.

FIG. 9 illustrates a method of receiving first type service data using the second type service generation indicator.

In FIG. 9, the terminal receives a downlink data channel 920 for the first type service through downlink control information in a downlink control channel 910 during an $N^{th}$ transmission interval 900. At this time, a data channel 930 configured to the second type service data may exist within the downlink data channel 920. If a separate monitoring interval for monitoring a second type service generation indicator does not exist within the $N^{th}$ data transmission interval, whether the second type service data is generated is detected only through the downlink control channel 950 retransmitted later. Accordingly, through the second type service generation indicator (included in the control information), the terminal may determine that there was generation of the second type service through control information within the downlink control channel 950 indicating retransmission. Alternatively, the second type service generation indicator may be included in terminal-specific downlink control information or common downlink control information.

Through the second type service generation indicator, the terminal may perform adaptive HARQ combining between data of the downlink data channel 970 in the retransmission interval and data of the downlink data channel 920 in the previous transmission interval. The adaptive HARQ combining means that only retransmitted data is demodulated and decoded in a region indicated by the second type service generation indicator and demodulation and decoding are performed after HARQ combining in other regions. At this time, the region indicated by the second type service generation indicator may be at least larger than a resource region 930 including data of the second type service. As described above, the unit of the second type service generation indicator may be a time (symbol, slot, or mini-slot), a frequency (PRB, PRB group, or bandwidth part), a code block (or a code block group), or a combination thereof.

Code block groups corresponding to the part indicated by the second type service generation indicator in the downlink data channel 970 including retransmitted data may have RV values different from those of code blocks corresponding to the part which is not indicated by the indicator. That is, if downlink control information included in the downlink control channel 950 indicating retransmission indicates one RV value, code blocks that satisfy the following conditions indicated by the second type service generation indicator existing through the downlink control information may preferentially have an RV value configured in the data channel 960 including the corresponding code blocks compared to an RV value indicated by the downlink control information of the downlink control channel 950.

The above-described conditions are as follows.

1. If the indication unit of the second type service generation indicator is a code block, the code block corresponds to the indicated code block.

2. If the indication unit of the second type service generation indicator is a code block group, the code blocks correspond to all code blocks belonging to the indicated code block group.

3. If the indication unit of the second type service generation indicator is a time (symbol, mini-symbol, or slot), a frequency (PRB, PRB group, or bandwidth part), or a combination thereof, the code blocks correspond to all code blocks at least partially overlap the resource region indicated by the corresponding second type service generation indicator.

A method of configuring the RV value configured in the data channel 960 may be different from a method of configuring the RV value indicated by downlink control information of the downlink control channel 950. For example, the RV value may be configured as a predetermined value through the standard, semi-statically configured through higher layer signaling (SIB, RRC, or MAC CE), configured as an RV value indicated by downlink control information transmitted before the corresponding transmission (that is, an RV value configured in previous transmission), or configured by a combination thereof (for example, a new RV value may be generated through the RV value configured in the previous transmission and the currently indicated RV value on the basis of arithmetic operations or logical operation.

Figure 10:
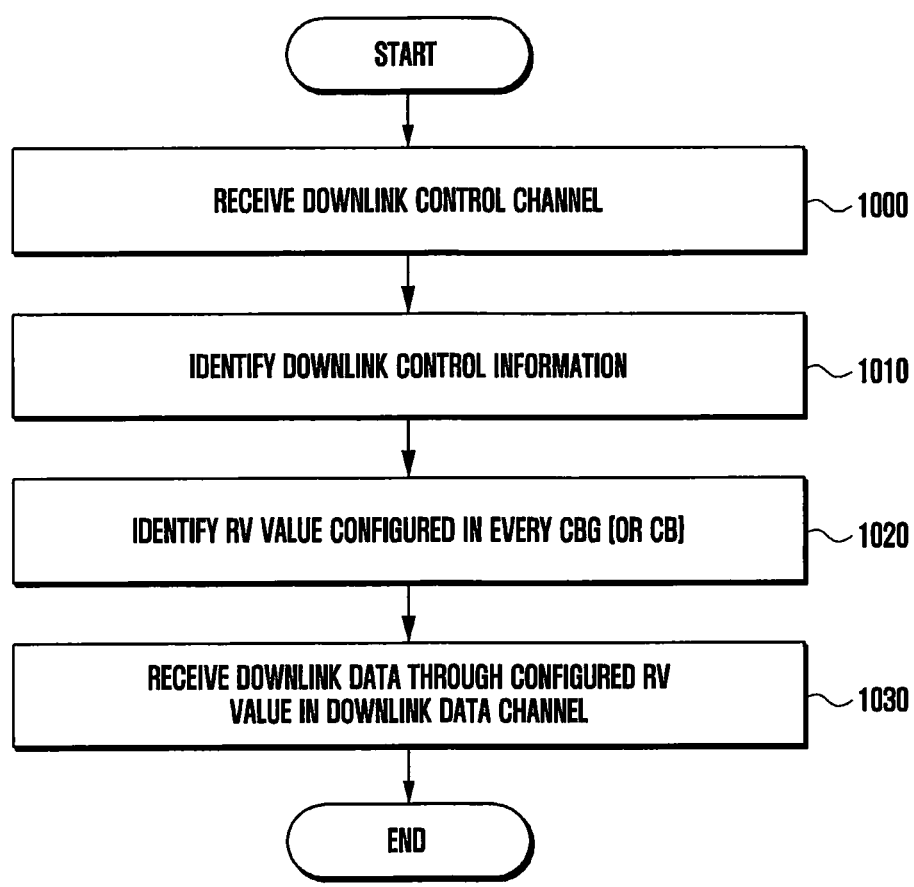
FIG. 10 is a block diagram illustrating a process in which a terminal receives downlink data information according to a first embodiment.

FIG. 10 is a block diagram illustrating a process in which the terminal receives downlink data information according to a first embodiment.

FIG. 10 shows a terminal operation in the state in which an RV value is configured for each CB or each CBG. First, the terminal receives a downlink control channel in step 1000 and identifies downlink control information in step 1010. The terminal identifies an RV value configured in every CBG (or every CB) within the downlink control information in step 1020. The terminal receives, demodulates, and decodes downlink data information (or transport block) in a downlink data channel indicated by the downlink control information on the basis of the RV value configured for each CB or each CBG in step 1030.

Figure 11:
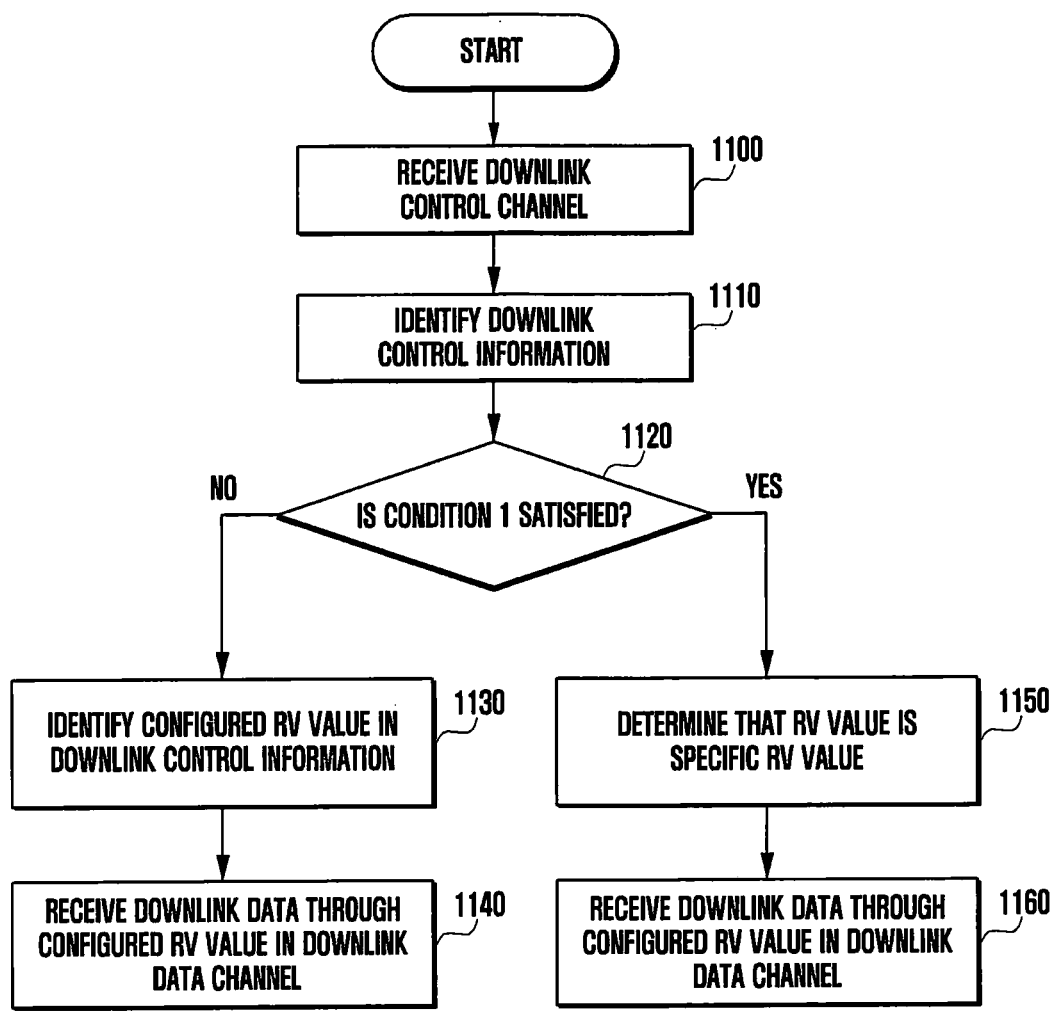
FIG. 11 is a block diagram illustrating a process in which the terminal receives downlink data information according to a second embodiment.

FIG. 11 is a block diagram illustrating a process in which the terminal receives downlink data information according to a second embodiment.

FIG. 11 shows a terminal operation available in the state in which an RV value is configured for each transport block. The terminal receives a downlink control channel in step 1100 and identifies downlink control information in step 1110. The terminal determines whether condition 1 below is satisfied on the basis of field information included in the downlink control information in step 1120. Condition 1 is as follows.

1. Current transmission is retransmission through the second type service generation indicator such as URLLC, and the second type service such as URLLC is at least partially generated in previous transmission.

2. Current transmission is retransmission through the second type service generation indicator such as URLLC, the second type service such as URLLC is at least partially generated in previous transmission, and the size of a resource region in which the second type service is generated occupies a predetermined threshold or more in the entire resource region previously transmitted.

3. Current transmission is retransmission through the second type service generation indicator such as URLLC, the second type service such as URLLC is at least partially generated in previous transmission, and a code block (or a code block group) having at least a damaged portion can be detected through the corresponding second type service generation indicator.

If one or more of the conditions are satisfied, the base station determines that an RV value (configured in advance by the standard, semi-statically configured through a higher layer signal, or dynamically configured through a physical signal) is applied to the corresponding retransmitted all code blocks in step 1150.

Alternatively, if one or more of the conditions are satisfied, the base station determines that an RV value (configured in advance by the standard, semi-statically configured through a higher layer signal, or dynamically configured through a physical signal) (for example, an RV value indicating a system bit or an RV value applied in previous transmission) is applied at least only to the corresponding retransmitted code blocks (or code block group) indicated by the second type service generation indicator and that the remaining code blocks (or code block group) which are not indicated follow an RV value indicated by the downlink control information in step 1150.

The terminal receives, demodulates, and decodes downlink data information (or transport block) using the configured RV values in the downlink data channel indicated by the downlink control information in step 160.

In the conditions are not satisfied, the terminal identifies the RV value configured in the downlink control information in step 1130. The terminal receives, demodulates, and decodes downlink data information (or transport block) through the configured RV value in the downlink data channel indicated by the downlink control information in step 1140.

Figure 12:
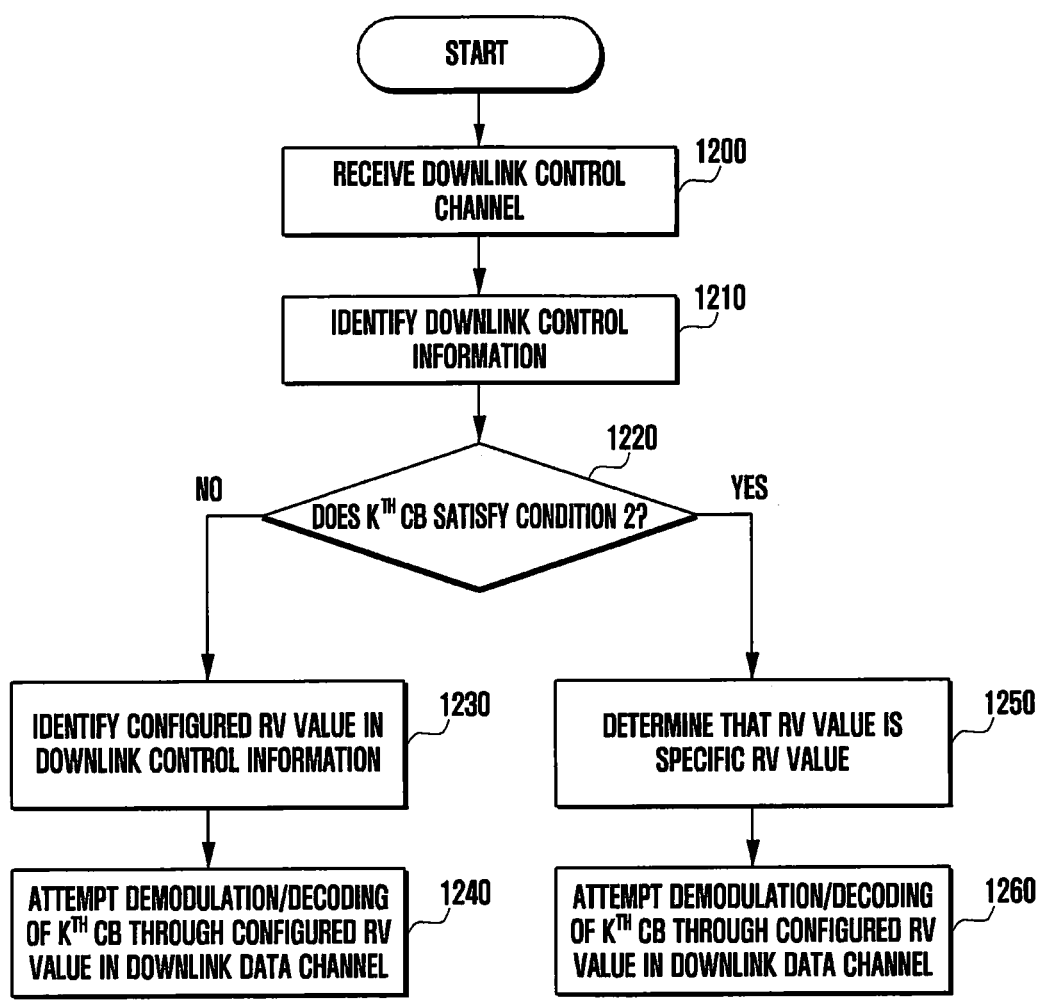
FIG. 12 is a block diagram illustrating a process in which the terminal receives downlink data information according to a third embodiment.

FIG. 12 is a block diagram illustrating a process in which the terminal receives downlink data information according to a third embodiment. FIG. 12 shows a terminal operation available in the state in which an RV value is configured for each transport block. The terminal receives a downlink control channel in step 1200 and identifies downlink control information in step 1210. The terminal determines whether a $k^{th}$ CB satisfies condition 2 below through field information included in the downlink control information in step 1220. Condition 2 is as follows.

1. The case in which at least a portion of the region indicated by the second type service generation indicator such as URLLC is a region to which the $k^{th}$ CB was allocated (in previous transmission).

2. The case in which the second type service generation indicator such as URLLC indicates the $k^{th}$ CB.

3. The case in which the second type service generation indicator such as URLLC indicates a CBG including the $k^{th}$ CB.

If one or more of the conditions are satisfied, the base station determines that an RV value configured in advance (by the standard, semi-statically through a higher layer signal, or dynamically through a physical signal) (for example, an RV value indicating a system bit or an RV value applied in previous transmission) is applied to the $k^{th}$ code block (or a code block group including the $k^{th}$ code block) in step 1250. The terminal receives, demodulates, and decodes the $k^{th}$ code block using the configured RV value in the downlink data channel in step 1260.

If the conditions are not satisfied, the base station determines that the $k^{th}$ code block (or the code block group including the $k^{th}$ code block) follows an RV configuration value in units of transport blocks included in the downlink control information in step 1230. The terminal receives, demodulates, and decodes the $k^{th}$ code block using the configured RV value in the downlink data channel in step 1140.

Figure 13:
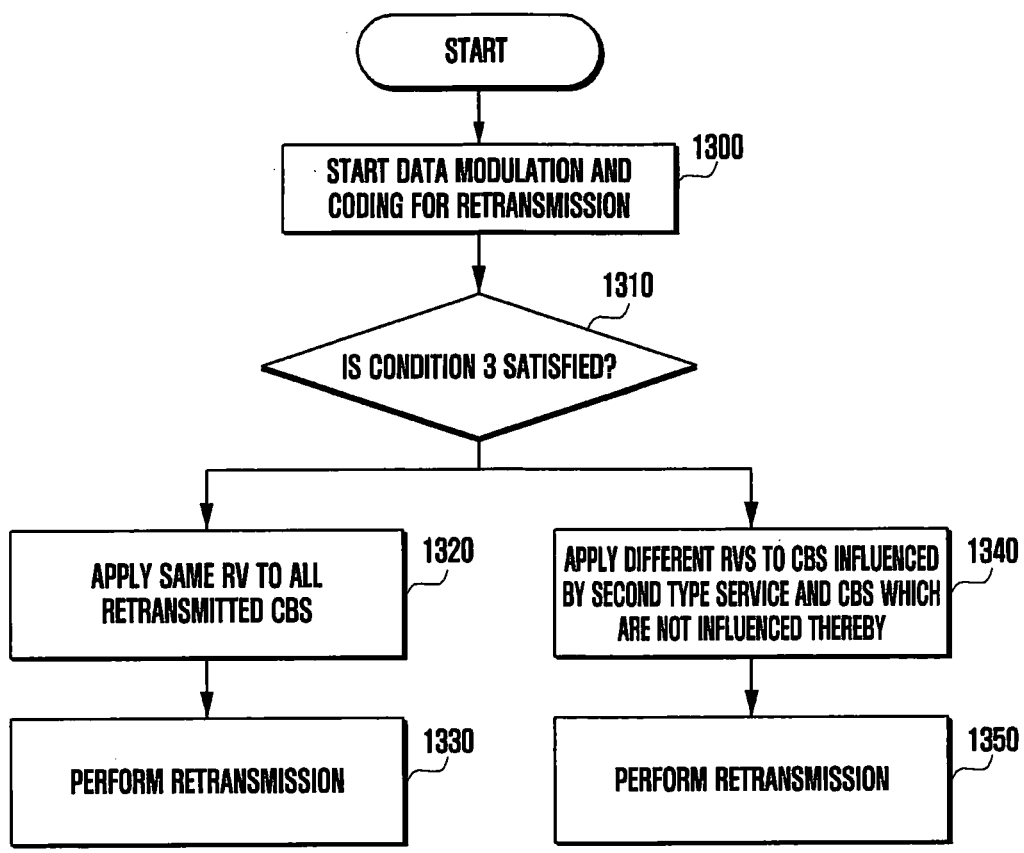
FIG. 13 is a block diagram illustrating a process in which a base station base station transmits downlink data information according to a fourth embodiment.

FIG. 13 is a block diagram illustrating a process in which the base station transmits downlink data information according to a fourth embodiment. FIG. 13 shows a method by which the base station applies different RV values to code blocks which are influenced by the second type service such as URLLC and code blocks which are not influenced thereby in data retransmission. First, the base station determines that previous transmission fails and starts data modulation and coding for retransmission in step 1300. The base station determines whether condition 3 is satisfied in step 1310. Condition 3 is as follows.

1. Previous transmission fails due to data transmission for the second type service such as URLLC.
2. Previous transmission fails due to data transmission for the second type service such as URLLC and corresponding retransmission is second transmission.

If one or all of the conditions are satisfied, the base station applies different RV values to code blocks damaged by allocation of data of the second type service and code blocks which are not damaged in step 1340. For example, it may be assumed that the RV value applied in previous transmission is used for the code blocks influenced by the second type service and the RV value indicating the system bit is applied thereto. Alternatively, an RV value determined in advance (by the standard, semi-statically through a higher layer signal, or dynamically through a physical signal) may be applied. The base station modulates and codes the code blocks according to the corresponding RV values and then retransmits the code blocks to the terminal in step 1350.

If the conditions are not satisfied, the base station applies the same RV values to all retransmitted code blocks in step 1320. The corresponding RV values are included in downlink control information transmitted to the terminal. The base station modulates and codes the code blocks according to the corresponding RV values and then retransmits the code blocks to the terminal in step 1330.

Figure 14:
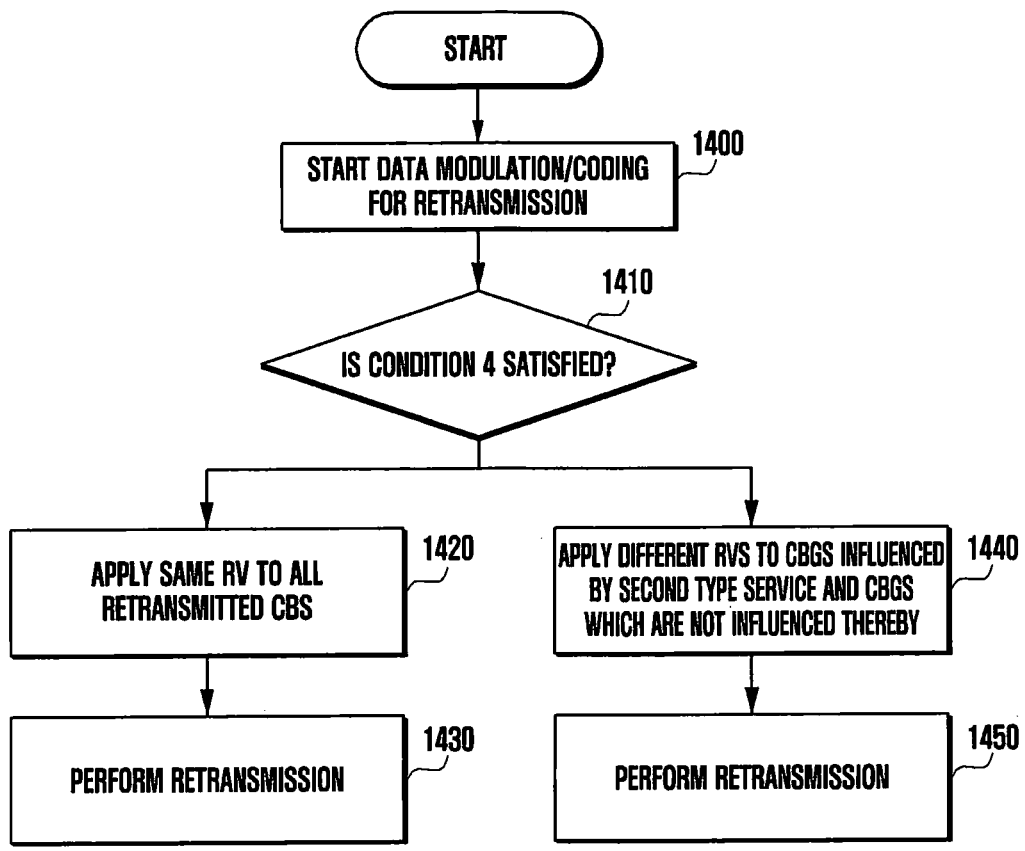
FIG. 14 is a block diagram illustrating a process in which the base station transmits downlink data information according to a fifth embodiment.

FIG. 14 is a block diagram illustrating a process in which the base station transmits downlink data information according to a fifth embodiment. FIG. 14 shows a method of applying different RV values to code block groups which are influenced by the second type service such as URLLC and code block groups which are not influenced thereby in data retransmission. First, the base station determines that previous transmission fails and starts data modulation and coding for retransmission in step 1400. The base station determines whether condition 4 below is satisfied in step 1410. Condition 4 is as follows.

1. Previous transmission fails due to data transmission for the second type service such as URLLC.
2. Previous transmission fails due to data transmission for the second type service such as URLLC and corresponding retransmission is second transmission.

If one or all of the conditions are satisfied, the base station applies different RV values to code block groups damaged by allocation of data of the second type service and code block groups which are not damaged in step 1440. The code block group damaged by the data allocation means the case in which at least one code block belonging to the code block group is damaged by the data of the second type service. For example, it may be assumed that the RV value applied in previous transmission is used for the code block groups influenced by the second type service and the RV value indicating the system bit is applied thereto. Other RV values determined in advance (by the standard, semi-statically through a higher layer signal, or dynamically through a physical signal) may be applied. The base station modulates and codes the code block groups according to the corresponding RV values and then retransmits the code block groups to the terminal in step 1450.

If the conditions are not satisfied, the base station applies the same RV values to all retransmitted code block groups in step 1420. The corresponding RV values are included in downlink control information transmitted to the terminal. The base station modulates and codes code blocks within each of the code block groups according to the corresponding RV values and then retransmits the code block groups to the terminal in step 1430.

If the RV value in the downlink control information has only 1 bit, the process of determining that different RV values are applied to code blocks or code blocks within the retransmitted transport block through the indicator for the second type service may be effective only in first retransmission (or second transmission). That is, the RV configuration method applied to the disclosure may be effective only in the case in which corresponding transmission is first retransmission (or second transmission).

The embodiments of the disclosure correspond to a method which can be applied to the case in which both the base station and the terminal are aware of subsequent transmission after initial transmission. Alternatively, the embodiments may be always applied regardless of a specific number of transmissions. Alternatively, the operations proposed by the disclosure may be sufficiently applied to all operations other than initial transmission. Alternatively, the operations proposed by the disclosure may be applied when the second type service generation indicator is activated. Alternatively, the operations proposed by the disclosure may be applied when the terminal determines that corresponding transmission is retransmission on the basis of an HARQ process number of an NDI.

Figure 15:
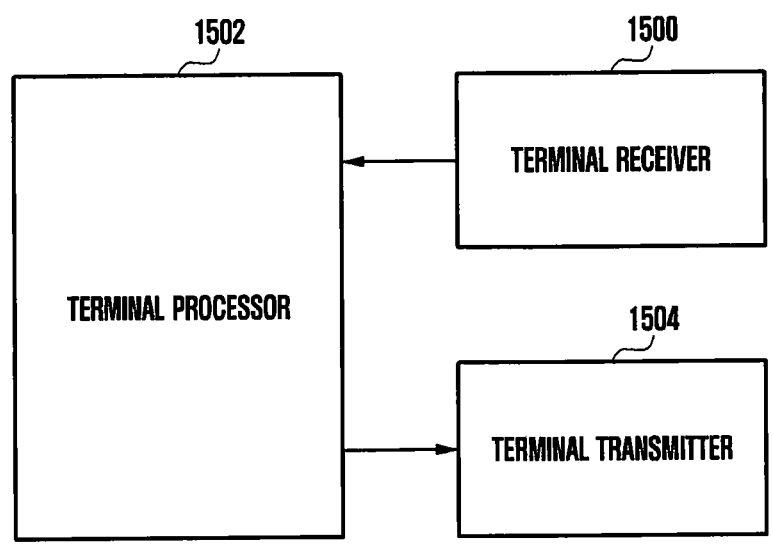
FIG. 15 is a block diagram illustrating the structure of the terminal according to embodiments of the disclosure.

FIG. 15 is a block diagram illustrating the structure of a terminal according to embodiments of the disclosure.

Referring to FIG. 15, a terminal according to the disclosure may include a terminal receiver 1500, a terminal transmitter 1504, and a terminal processor 1502. The terminal receiver 1500 and the terminal transmitter 1504 may be collectively referred to as a transceiver in embodiments of the disclosure. The transceiver may transmit and receive a signal to and from the base station. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver may receive a signal through a radio channel, output the signal to the terminal processor 1502, and transmit the signal output from the terminal processor 1502 through the radio channel. The terminal processor 1502 may control a series of processes for the operation of the terminal according to the aforementioned embodiments.

Figure 16:
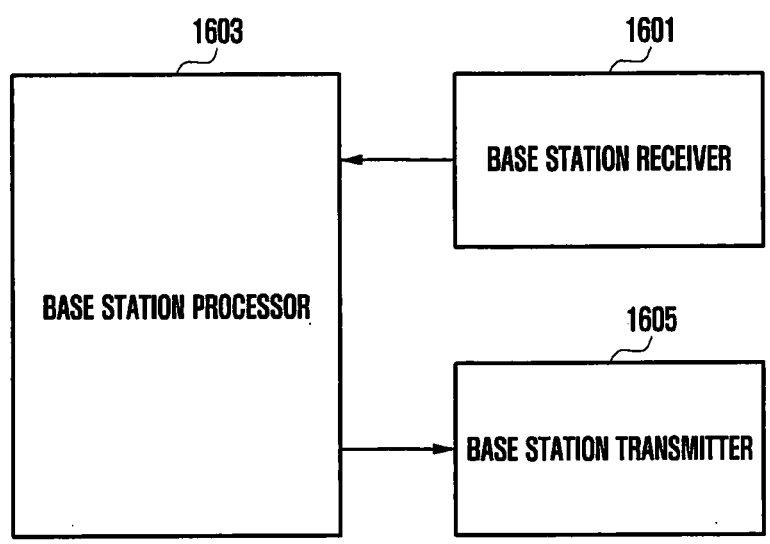
FIG. 16 is a block diagram illustrating the structure of the base station according to embodiments of the disclosure.

FIG. 16 is a block diagram illustrating the structure of a base station according to embodiments of the disclosure.

Referring to FIG. 16, the base station may include at least one of a base station receiver 1601, a base station transmitter 1605, and a base station processor 1603. The base station receiver 1601 and the base station transmitter 1605 are commonly called a transceiver in the embodiments of the disclosure. The transceiver may transmit and receive a signal to and from the terminal. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver may receive a signal through a radio channel, output the signal to the base station processor 1603, and transmit the signal output from the base station processor 1603 through the radio channel. The base station processor 1603 may control a series of processes for the operation of the base station according to the aforementioned embodiments of the disclosure.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, the first, second, and third embodiments of the disclosure may be partially combined to operate a base station and a terminal. Further, although the above embodiments have been described on the basis of the NR system, it may also be possible to implement other variant embodiments on the basis of the technical idea of the embodiments in other systems such as FDD or TDD LTE systems.

Although exemplary embodiments of the disclosure have been shown and described in this specification and the drawings, they are used in general sense in order to easily explain technical contents of the disclosure, and to help comprehension of the disclosure, and are not intended to limit the scope of the disclosure. It is apparent to those skilled in the art that other modified examples based on the technical idea of the disclosure can be implemented as well as the embodiments disclosed herein.

The invention claimed is:

1. A method of receiving data by a terminal in a communication system, the method comprising:
receiving, from a base station, downlink control information for scheduling retransmission of one or more code block groups (CBGs) of a transport block and including an indicator associated with the one or more CBGs; and
receiving, from the base station, the retransmitted one or more CBGs based on the indicator,
wherein whether earlier received one or more CBGs are corrupted or the retransmitted one or more CBGs are combinable with the earlier received one or more CBGs is identified based on the indicator, and
wherein, in case that the indicator does not indicate that the earlier received one or more CBGs are corrupted, the retransmitted one or more CBGs are combinable with corresponding earlier received one or more CBGs.

2. The method of claim 1, wherein the earlier received one or more CBGs correspond to the retransmitted one or more CBGs.

3. The method of claim 1, wherein the indicator is included in the downlink control information based on the indicator being enabled for the terminal.

4. A method of transmitting data by a base station in a communication system, the method comprising:
transmitting, to a terminal, downlink control information for scheduling retransmission of one or more code block groups (CBGs) of a transport block and including an indicator associated with the one or more CBGs; and
transmitting, to the terminal, the one or more CBGs for retransmission,
wherein whether earlier received one or more CBGs are corrupted or the retransmitted one or more CBGs are combinable with the earlier received one or more CBGs is identified based on the indicator, and
wherein, in case that the indicator does not indicate that the earlier transmitted one or more CBGs are corrupted, the retransmitted one or more CBGs are combinable with corresponding earlier transmitted one or more CBGs.

5. The method of claim 4, wherein the earlier transmitted one or more CBGs correspond to the retransmitted one or more CBGs.

6. The method of claim 4, wherein the indicator is included in the downlink control information based on the indicator being enabled for the terminal.

7. A terminal receiving data in a communication system, the terminal comprising:
a transceiver; and
a controller, configured to perform control to:
receive, from a base station, downlink control information for scheduling retransmission of one or more code block groups (CBGs) of a transport block and including an indicator associated with the one or more CBGs, and
receive, from the base station, the retransmitted one or more CBGs based on the indicator,
wherein whether earlier received one or more CBGs are corrupted or the retransmitted one or more CBGs are combinable with the earlier received one or more CBGs is identified based on the indicator, and
wherein, in case that the indicator does not indicate that the earlier received one or more CBGs are corrupted, the retransmitted one or more CBGs are combinable with corresponding earlier received one or more CBGs.

8. The terminal of claim 7, wherein the earlier received one or more CBGs correspond to the retransmitted one or more CBGs.

9. The terminal of claim 7, wherein the indicator is included in the downlink control information based on the indicator being enabled for the terminal.

10. A base station transmitting data in a communication system, the base station comprising:
a transceiver; and
a controller, configured to perform control to:
transmit, to a terminal, downlink control information for scheduling retransmission of one or more code block groups (CBGs) of a transport block and including an indicator associated with the one or more CBGs, and
transmit, to the terminal, the one or more CBGs for retransmission,
wherein whether earlier received one or more CBGs are corrupted or the retransmitted one or more CBGs are combinable with the earlier received one or more CBGs is identified based on the indicator, and
wherein, in case that the indicator does not indicate that the earlier transmitted one or more CBGs are corrupted, the retransmitted one or more CBGs are combinable with corresponding earlier transmitted one or more CBGs.

11. The base station of claim 10, wherein the earlier transmitted one or more CBGs correspond to the retransmitted one or more CBGs.

* * * * *